US008068048B1

(12) United States Patent
Janusas

(10) Patent No.: US 8,068,048 B1
(45) Date of Patent: Nov. 29, 2011

(54) WIRELESS MICROWAVE INTERFERER FOR DESTRUCTING, DISABLING, OR JAMMING A TRIGGER OF AN IMPROVISED EXPLOSIVE DEVICE

(76) Inventor: Saulius Janusas, Sea Cliff, NY (US)

( * ) Notice: Subject to any disclaimer, the term of this patent is extended or adjusted under 35 U.S.C. 154(b) by 894 days.

(21) Appl. No.: 12/148,354

(22) Filed: Apr. 18, 2008

Related U.S. Application Data

(60) Provisional application No. 60/925,610, filed on Apr. 20, 2007.

(51) Int. Cl.
*G01S 7/38* (2006.01)

(52) U.S. Cl. .......................................................... 342/14

(58) Field of Classification Search ..................... 342/14
See application file for complete search history.

(56) References Cited

U.S. PATENT DOCUMENTS 3,621,475 A * 11/1971 Walters ............................. 333/1
4,349,826 A * 9/1982 Lucanera ....................... 343/773
4,651,115 A * 3/1987 Wu ................................. 333/26
4,780,692 A * 10/1988 Kiedrowski ................... 333/108
4,797,680 A * 1/1989 Smethers, Jr. ................ 343/705
4,797,684 A * 1/1989 Bernstein et al. ............. 343/895
5,200,753 A 4/1993 Janusas
5,777,572 A 7/1998 Janusas
6,707,348 B2 * 3/2004 Ammar ........................... 333/26
6,795,031 B1 * 9/2004 Walker et al. ................. 343/713
6,967,543 B2 * 11/2005 Ammar ........................... 333/26
7,391,356 B2 * 6/2008 Brumley et al. ................ 342/13
2006/0164283 A1 * 7/2006 Karlsson ......................... 342/14
2008/0084345 A1 * 4/2008 Rougas et al. .................. 342/14
2009/0140921 A1 * 6/2009 Bongfeldt et al. ............ 342/372

* cited by examiner

*Primary Examiner* — Thomas Tarcza
*Assistant Examiner* — Matthew M Barker
(74) *Attorney, Agent, or Firm* — Charles E. Baxley

(57) ABSTRACT

A wireless microwave interferer for destructing, disabling, or jamming a trigger of an improvised explosive device. The interferer includes a power source interface, a control and monitoring panel, a waveform generator, a modulated HV power supply, at least one microwave generator, a waveguide to co-ax transformer and combiner, one of an ellipsoidal antenna and a spiral antenna, and an antenna adjustment mechanism. The power source interface interfaces with a power source. The waveform generator is connected to the modulated HV power supply and to the control and monitoring panel. The control and monitoring panel is connected to the power source interface, the modulated HV power supply, and the antenna adjustment mechanism. The modulated HV power supply is connected to the at least one microwave generator. The at least one microwave generator is connected to the waveguide to co-ax transformer and combiner. The waveguide to co-ax transformer and combiner is connected to the one of the ellipsoidal antenna and the spiral antenna. The one of the ellipsoidal antenna and the spiral antenna is connected to the antenna adjustment mechanism.

13 Claims, 3 Drawing Sheets

WIRELESS MICROWAVE INTERFERER FOR DESTRUCTING, DISABLING, OR JAMMING A TRIGGER OF AN IMPROVISED EXPLOSIVE DEVICE

1. CROSS REFERENCE TO RELATED APPLICATIONS

The instant non-provisional patent application claims priority from provisional patent application No. 60/925,610, filed on Apr. 20, 2007, entitled ANTI-IMPROVISED EXPLOSIVE DEVICE APPARATUS AND RELATED METHOD, and incorporated herein by reference thereto.

2. BACKGROUND OF THE INVENTION

A. Field of the Invention

The embodiments of the present invention relate to an interferer for jamming a trigger of an explosive device, and more particularly, the embodiments of the present invention relate to a wireless microwave interferer for destructing, disabling, or jamming a trigger of an improvised explosive device.

B. Description of the Prior Art

All modern electronic products utilize printed circuit board ("PCB") technology of many different types to physically mount, and electrically connect, electronic components to form a functioning electronic system. The PCB is a flat insulator upon which are many printed lands, i.e., conductors that serve as wires, to interconnect all of the electronic components. Most lands have at least two ends, with the majority of them being electrically connected to pins of integrated circuits ("ICs") and other electronic components.

When the lands are exposed to microwave radiation, they act as antennas and convert the microwave radiation into microwave frequency AC currents that are introduced directly into the electronic components. As a result of diode rectification, DC voltages and pulses appear on the terminals and on the interiors of the semiconductor components of the ICs. In this circuitry, stray capacitances from filters result in an appearance of unwanted steady DC levels that alter their delicate and critical bias conditions, which is equivalent to connecting batteries of random voltages to the terminals of the electronic devices. The affected circuitry amplifies these DC levels resulting in their saturation and inability to function. The same applies to digital circuitry as well, because digital circuits are essentially high gain, high bandwidth analog circuits spending most of their lives in saturated on or off states. During the short times, i.e., transitions, when they change from one state to another, they operate as normal analog circuits and are just as sensitive to unwanted DC levels. An additional effect of introduction of extra DC pulses and levels, due to modulation of the jamming signals, to the inputs of the circuits is their failure to function as per their designed logic flow. For example, logic gates, such as AND, OR, XOR, and their inverses, control the operation of all digital functions of a digital system. If any of their inputs is compromised with additional unexpected logic levels or pulses, the circuits will execute their function in accordance with their logic design, resulting in illogical or chaotic operation. Also, today's digital processors operate at gigahertz speeds and can actually process individual cycles of microwave signals as pulses if they appear at their inputs or within them, thus causing the same chaotic operation.

Today's terrorists employ modern electronics to construct bombs of various types to attack troops, non-combatants, government officials, and the like for personal or political purposes. These weapons are extremely difficult to deal with because they are usually well hidden and are remotely or automatically activated. The terrorists have at their disposal a myriad of electronic devices designed for peaceful purposes, such as cell phones, wireless phones, remote-controlled toys, pagers, handy-talkies, remote-controlled garage door openers, digital clocks, wireless door bells, infra red/microwave motion detectors, and the like, which are easily modifiable into improvised bomb triggers.

Conventional radio jammers have shown considerable success against wireless-based devices, but are ineffective against non-wireless devices. Another serious disadvantage of these conventional jammers is that the operating frequencies of the improvised bomb triggers are unknown, thus requiring the jammers to transmit on the entire radio spectrum to guarantee coverage. Because the jammers necessarily spread their power across the radio spectrum, jamming power per channel is inherently low. High power transmitters are required to insure ample jamming power on every channel. Furthermore, conventional jammer signals travel over great distances and can jam friendly radio communications as well.

Thus, their exists a need for a new type of jammer:

- That targets the semiconductor-based circuitry common in all modern electronic devices, regardless of their nature, such as wireless, infrared, analog and digital circuitry, and the like.
- That utilizes microwave techniques.
- That operates over a relatively short range of a few hundred feet.
- That disables the functioning of all types or electronic circuits.
- That does not interfere with untargeted friendly electronic devices.
- Whose microwave signals are modulated to further enhance the jamming function.
- That permanently damages/destroys targeted electronic devices by adjusting its beam pattern.
- That explodes even the simplest, and most difficult to defeat, electrically wired fire bombs from a safe distance.

Numerous innovations for jammers have been provided in the prior art, which will be described below in chronological order to show advancement in the art, and which are incorporated herein by reference thereto. Even though these innovations may be suitable for the specific individual purposes to which they address, however, they differ from the present invention in that they do not teach a wireless microwave interferer for destructing, disabling, or jamming a trigger of an improvised explosive device.

(1) U.S. Pat. No. 5,200,753 to Janusas.

U.S. Pat. No. 5,200,753 issued to Janusas on Apr. 6, 1993 in class 342 and subclass 14 teaches a first-extended, interactive amplifier operating at a fixed frequency, while a second similar amplifier sweeps across a frequency range. The respective extended, interactive amplifiers produce individual signals that are fed through separate waveguides to corresponding horns of an antenna. The frequency separation of the produced frequencies is made to match a threat radar's IF channels. By setting the jamming signal frequencies well above the threat radar band, the mixers of the threat radar receiver generate grossly unbalanced angle error signals. This disturbs the capability of the threat from homing in on the jamming site. Thus, the resulting jamming signal provides excellent electronic countermeasures.

(2) U.S. Pat. No. 5,777,572 to Janusas.

U.S. Pat. No. 5,777,572 issued to Janusas on Jul. 7, 1998 in class 342 and subclass 13 teaches a device for damaging electronic equipment, which has a millimeter wave generator, such as a gyrotron oscillator, for producing very high power millimeter waves. A beam-former antenna forms the millimeter waves into narrow beams for distance transmission. An antenna coupled to the gyrotron directs narrow beams of the millimeter waves to selected targets, whereby the beams damage electronic equipment at the targets. The millimeter wave generator produces frequencies ranging from about 100 to 140 GHz at 20 millisecond megawatt pulses at 400 kilowatts CW.

It is apparent that numerous innovations for jammers have been provided in the prior art, which are adapted to be used. Furthermore, even though these innovations may be suitable for the specific individual purposes to which they address, however, they would not be suitable for the purposes of the embodiments of the present invention as heretofore described, namely, a wireless microwave interferer for destructing, disabling, or jamming a trigger of an improvised explosive device.

3. SUMMARY OF THE INVENTION

Thus, an object of the embodiments of the present invention is to provide a wireless microwave interferer for destructing, disabling, or jamming a trigger of an improvised explosive device, which avoids the disadvantages of the prior art.

Briefly stated, another object of the embodiments of the present invention is to provide a wireless microwave interferer for destructing, disabling, or jamming a trigger of an improvised explosive device. The interferer includes a power source interface, a control and monitoring panel, a waveform generator, a modulated HV power supply, at least one microwave generator, a waveguide to co-ax transformer and combiner, one of an ellipsoidal antenna and a spiral antenna, and an antenna adjustment mechanism. The power source interface interfaces with a power source. The waveform generator is connected to the modulated HV power supply and to the control and monitoring panel. The control and monitoring panel is connected to the power source interface, the modulated HV power supply, and the antenna adjustment mechanism. The modulated HV power supply is connected to the at least one microwave generator. The at least one microwave generator is connected to the waveguide to co-ax transformer and combiner. The waveguide to co-ax transformer and combiner is connected to the one of the ellipsoidal antenna and the spiral antenna. The one of the ellipsoidal antenna and the spiral antenna is connected to the antenna adjustment mechanism.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

4. BRIEF DESCRIPTION OF THE DRAWING

The figures of the drawing are briefly described as follows.

5. LIST OF REFERENCE NUMERALS UTILIZED IN THE DRAWING

Figure 1:
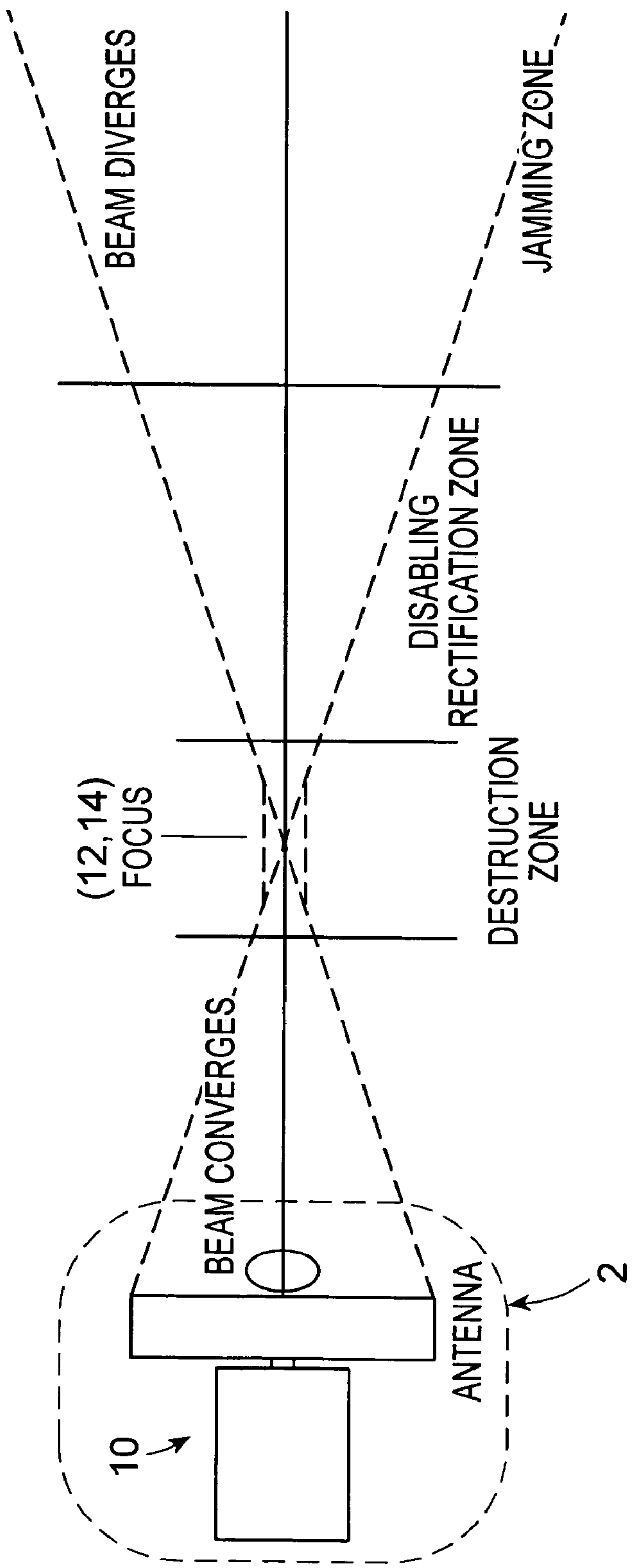
FIG. 1 is a diagrammatic view of the wireless microwave interferer of the embodiments of the present invention destructing, disabling, or jamming a trigger of an improvised explosive device.

A. General.
10 wireless microwave interferer of embodiments of present invention for destructing, disabling, or jamming a trigger 12 of an improvised explosive device 14
12 trigger of improvised explosive device 14
14 improvised explosive device
B. Specific Configuration of Wireless Microwave Interferer 10.
16 power source interface
18 control and monitoring panel
20 waveform generator
22 modulated HV power supply
24 at least one microwave generator
26 waveguide to co-ax transformer and combiner
28 ellipsoidal antenna
30 antenna adjustment mechanism
32 power source
C. Illustration.
34 point of convergence
36 small array of spiral antennas

6. DETAILED DESCRIPTION OF THE PREFERRED EMBODIMENTS

A. The Principles of Operation

All active semiconductor devices are composed of basic building blocks that in their most basic form are diodes. For example, a simple transistor can be thought as of being an integral combination of two diodes.

Even the most modern and complex integrated circuits ("ICs"), such as processors, memories, digital, analog, and all other types of ICs, are integrated combinations of transistors, and hence, are ultimately made up of diodes.

It is well known that the primary function of diodes is rectification, i.e., changing AC current into DC current. The embodiments of the present invention utilize this property by introducing microwave signals into semiconductor circuits, which forces the diodes to generate unwanted internal DC voltages throughout, which upsets or stops their proper functioning.

Examination of electronic PCBs found in typical electronic devices reveals that the lengths of interconnecting lands and wiring range between about 0.5 and 10 centimeters, with about 30% of them being in the range of 2 to 5 centimeters. This indicates that in order to utilize the lands and wiring as quarter wave antennas to maximize the capture of incident jamming microwave radiation, the wavelength of the jamming signal should be of the order of 12 centimeters or a frequency of 2.5 GHz. This is a fortuitous result because the desired frequency falls on the edge of the Industrial, Scientific, and Medical ("ISM") band for which the technology of generating high power microwave devices is well developed, available on off-the-shelf basis, and is expensive. The most common and useful high power devices are CW magnetrons used in industrial processing heating apparatus, commercial, and consumer applications, such as microwave ovens. The output power levels of the available CW magnetrons range from about 500 watts to tens of kilowatts.

Another important aspect of the use of a 12 centimeter wavelength is that maximum manufacturing tolerances of the antenna and other related components are of the order of 1/30 of a wavelength or 0.4 cm, thus making manufacturing relatively inexpensive.

B. General

Referring now to the figures, in which like numerals indicate like parts, and particularly to FIG. 1, which is a diagrammatic view of the wireless microwave interferer of the embodiments of the present invention destructing, disabling, or jamming a trigger of an improvised explosive device, the wireless microwave interferer of the embodiments of the present invention is shown generally at 10 for destructing, disabling, or jamming a trigger 12 of an improvised explosive device 14.

The wireless interfere 10 is designed to disable all commercially available electronic devices that can be used by terrorists as improvised triggers for explosive devices. The key feature of the design is that its emissions interact with, and directly adversely affect, the basic functioning of semiconductor devices regardless of the type of circuitry in which they are employed, be it radio, ultrasonic, infra-red, analog or digital, and any combination thereof. The emissions from the wireless microwave interferer 10 are in a form of a beam, and affects electronics only within the beam.

The wireless microwave interferer 10 may be installed on land vehicles traveling in improvised explosive devices ("IEDs")-prone environments. This being the case, it seems that suppression of IEDs should be mostly in the direction of motion and the sides of the vehicle. There are many other platforms where the wireless microwave interferer 10 can be installed, including aircraft, and used as in offensive rather than defensive operations. Offensive operations may be in the form of flying helicopters equipped with higher power wireless microwave interferers 10 over terrorist areas, and exploding their own IEDs in their encampments.

The wireless microwave interferer 10 is designed to generate a high power 2.46 GHz adjustable-geometry, modulated, microwave beam used to illuminate suspect areas where electronically-activated IEDs might be hidden for the purpose of disabling, neutralizing, or safely exploding them from a safe distance.

C. The Specific Configuration of the Wireless Microwave Interferer 10

Figure 2:
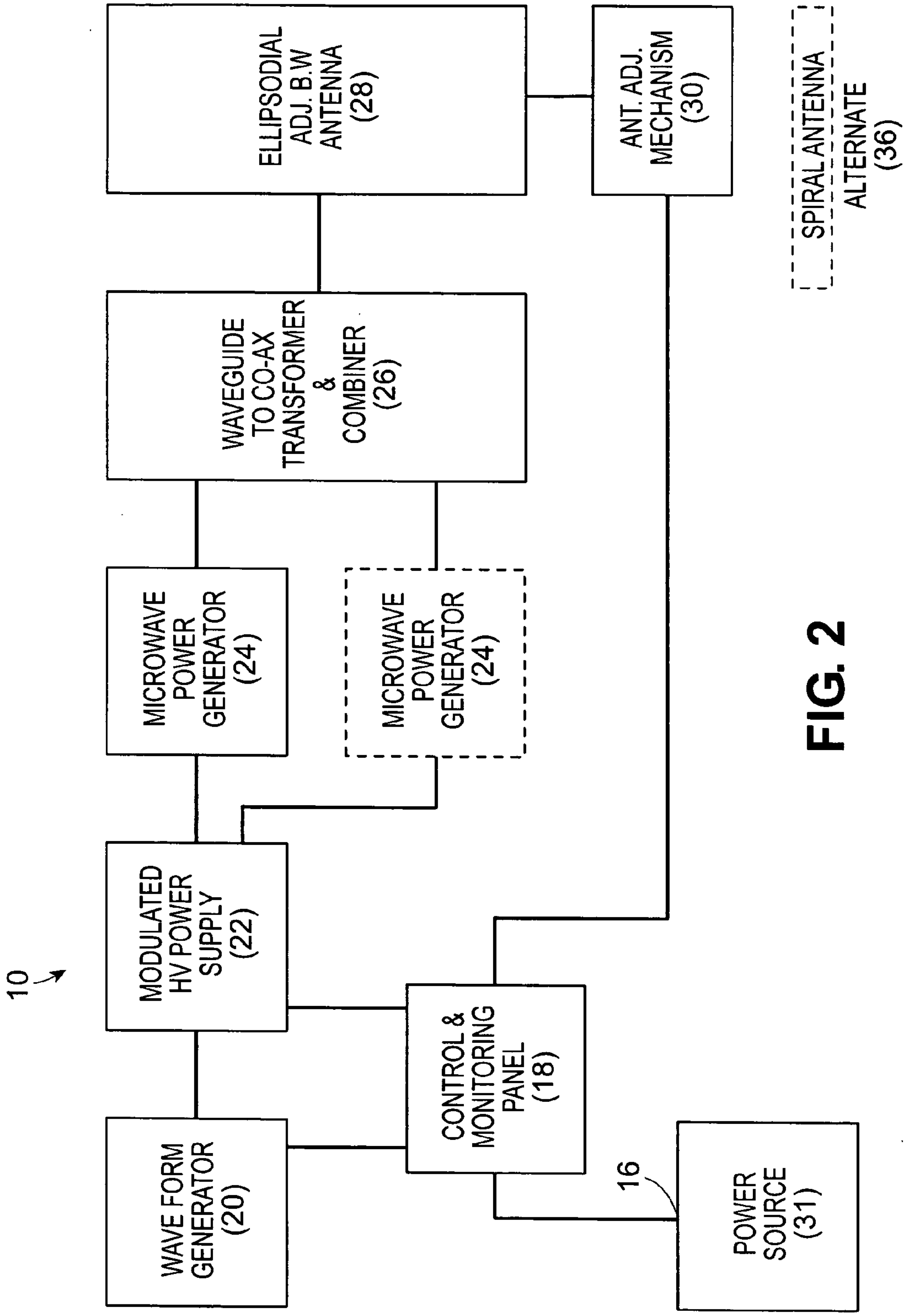
FIG. 2 is a diagrammatic block diagram of the area generally enclosed by the dotted curve identified by ARROW 2 in FIG. 1 of the wireless microwave interferer of the embodiments of the present invention.

The specific configuration of the wireless microwave interferer 10 can best be seen in FIG. 2, which is a diagrammatic block diagram of the area generally enclosed by the dotted curve identified by ARROW 2 in FIG. 1 of the wireless microwave interferer of the embodiments of the present invention, and a such, will be discussed with reference thereto.

The wireless microwave interferer 10 comprises a power source interface 16, a control and monitoring panel 18, a waveform generator 20, a modulated HV power supply 22, at least one microwave generator 24, a waveguide to co-ax transformer and combiner 26, an ellipsoidal antenna 28, and an antenna adjustment mechanism 30.

The power source interface 16 interfaces with a power source 31. The waveform generator 20 is connected to the modulated HV power supply 22 and to the control and monitoring panel 18. The control and monitoring panel 18 is connected to the power source interface 16, the modulated HV power supply 22, and the antenna adjustment mechanism 30. The modulated HV power supply 22 is connected to the at least one microwave generator 24. The at least one microwave generator 24 is connected to the waveguide to co-ax transformer and combiner 26. The waveguide to co-ax transformer and combiner 26 is connected to the ellipsoidal antenna 28. The ellipsoidal antenna 28 is connected to the antenna adjustment mechanism 30.

(1) The Power Source 31.

The power source 31 is the primary power source to power the wireless microwave interferer 10, is capable of delivering reliably several kilowatts, and is one of:

Standard house current (120/240 VAC 50/60 Hz).

Military/aviation power (120/240 VAC 400 Hz).

Automotive 12/24 VDC with inverter to convert the DC to one of the above.

(2) The Control and Monitoring Panel 18.

The control and monitoring panel 18 contains all necessary controls and indicators to effectively operate the wireless microwave interferer 10, controls the wave form generator 20, the modulated HV power supply 22, and the antenna adjustment mechanism 30, and displays status of primary power, system operational voltages and currents, and other system settings.

(3) The Wave Form Generator 20.

The wave form generator 20 generates a number of different selectable waveforms tailored to have maximum effectiveness on different classes of targets.

(4) The Modulated HV Power Supply 22.

The modulated HV power supply 22 provides all necessary voltages and signals for the wireless microwave interferer 10. Low voltages feed the wave form generator 20, filaments of high power RF devices (magnetrons), the antenna adjustment mechanism 30, and performance indicators. The High Voltage/High Power section of the power supply 31 responds to signals from the at least one microwave generator 24, and converts them into high power signals that feed the high power RF devices (magnetrons).

(5) The at Least One Microwave Power Generator 24.

The at least one microwave power generator 24 is a magnetron that converts high power modulated signals from the modulated HV power supply 22 into high power, modulated, microwave jamming signals. When only one magnetron is activated, the jamming mode is rectification. When two magnetrons are activated simultaneously, the two modes of jamming are active, rectification, and spectrum generation. The magnetron 24 operates at a high-duty cycle, and is cooled by a cooling system.

(6) The Waveguide to Co-Ax Transformer and Combiner 26.

The waveguide to co-ax transformer and combiner 26 combines the High Power Microwave signals from the two magnetrons, converts their output into a single co-axial mode output port, and is much simpler to implement mechanically than a less lossy waveguide-based network. Run lengths involved, however, are short and losses are tolerable.

(7) The Ellipsoidal Antenna 28.

The ellipsoidal antenna 28 directs microwave signals against the improvised explosive device 14 that is to be one of disabled, jammed, and damaged, and is a dish-type antenna having an ellipsoidal rather than paraboloid surface contour. From analytic geometry, ellipsoids have 2 foci meaning that if microwave energy is introduced at one focal point, all of the energy is reflected from the antenna surface and passes through the second focal point, thus generating a "hot spot" a distance away from the first focal point. Furthermore, by varying distance between primary radiator and the ellipsoidal antenna 28, the "hot spot" is moved about in space as desired, and width of the antenna beam is varied as well.

Since the wireless microwave interferer 10 is intended for use at relatively short ranges, it is important to concentrate its power in the beam over the short ranges. The ellipsoidal antenna 28 does exactly that.

D. An Illustration

Figure 3A:
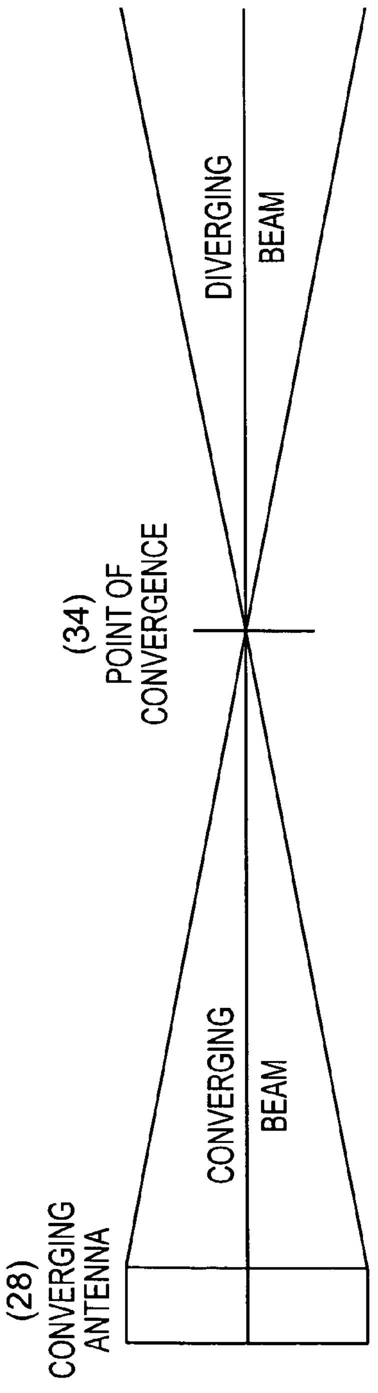
FIG. 3A is a diagrammatic representation of the point of convergence of microwave energy at the second focus of the ellipsoidal antenna.

FIG. 3A, which is a diagrammatic representation of the point of convergence of microwave energy at the second focus of the ellipsoidal antenna, shows the point of convergence 34 of microwave energy at the second focus of the ellipsoidal antenna 28. As the range increases, the cross sectional area of the beam decreases to the point of convergence 34. And, since all of the energy remains within the beam, by necessity, the energy density increases up to the point of convergence 34.[1] At the point of convergence 34, the energy density is at maximum. Beyond the point of convergence 34, the beam diverges and the energy density decreases.[2]

[1] By virtue of the square law.

[2] By virtue of the inverse square law.

Figure 3B:
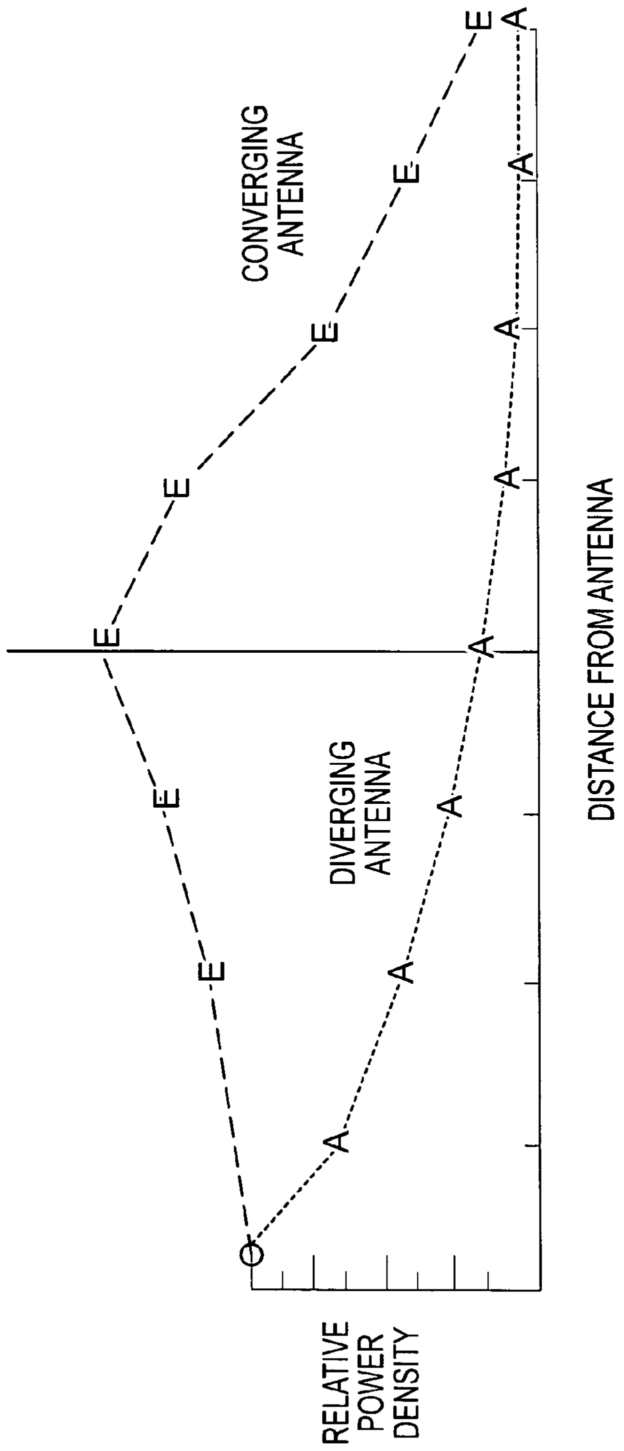
FIG. 3B is a graph of beam density versus distance from antenna comparing an average parabolic antenna with the ellipsoidal antenna of the wireless microwave interferer of the embodiments of the present invention.

FIG. 3B, which is a graph of beam density versus distance from antenna comparing an average parabolic antenna with the ellipsoidal antenna of the wireless microwave interferer of the embodiments of the present invention, shows the power density as CURVE A of an average parabolic dish antenna. As noted, the power density is in continual decline as the range decreases. The performance of the ellipsoidal antenna as CURVE E shows the power density first increasing with range up to a maximum at the point of convergence 34 and then decreases thereafter. Clearly, at short ranges, the ellipsoidal antenna produces a much more intense field than a paraboloidal antenna.

E. A Small Array of Spiral Antennas 36

Because of their compactness and ease of manufacture, a small array of spiral antennas 36 (FIG. 2) can be configured to duplicate the function of the ellipsoidal antenna 28. This type of an array would be particularly useful in airborne applications.

F. An Example

For demonstrating the operation of the embodiments of the present invention, 2.45 GHz, one kilowatt magnetrons were selected. It was also demonstrated that the wireless microwave interferer 10 did not interfere with communications not exposed to the beam. A random collection of typical devices are exposed to the disabling beam for demonstrating the effectiveness of the wireless microwave interferer 10. The devices include:

(1) Non-Radio Based Devices.
- IR motion detectors.
- Digital clocks.
- Electric eyes.
- Cassette tape recorders.
- Simulated blasting caps. Laptop computers.

(2) Radio-Based Devices.
- CB radio transceivers (27 MHz).
- Radio-controlled toys (27 MHz).
- Garage door opener receivers (300 MHz).
- Model aircraft radio-controlled receivers (75 MHz).
- Cordless phones (49, 900, & 2400 MHz).
- Cell phones (800 & 1800 MHz).
- GPS receivers (1575 MHz).
- Police-band hand-held radios (470 MHz).
- Fire department-band hand-held radios (170 MHz).
- Marine-band hand-held radios (160 MHz).
- Marine-band base stations (160 MHz).
- Ham radios (2 meter) hand-held (144 MHz).
- AM-FM radios (1 MHz & 88-108 MHz).
- Microwave motion detectors (10.5 GHZ).

G. The Conclusions

It will be understood that each of the elements described above or two or more together may also find a useful application in other types of constructions differing from the types described above.

While the embodiments of the present invention have been illustrated and described as embodied in a wireless microwave interferer for destructing, disabling, or jamming a trigger of an improvised explosive device, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A wireless microwave interferer for destructing, disabling, or jamming a trigger of an improvised explosive device, comprising:
- a) a waveform generator;
- b) at least one microwave generator;
- c) a waveguide to co-ax transformer and combiner; and
- d) an ellipsoidal antenna;

wherein said at least one microwave generator is connected to said waveguide to co-ax transformer and combiner; and wherein said waveguide to co-ax transformer and combiner is connected to said ellipsoidal antenna, wherein said ellipsoidal antenna directs microwave signals against the improvised explosive device that is to be destructed, disabled, or jammed;

wherein said ellipsoidal antenna concentrates its power in a beam over short ranges;

wherein said ellipsoidal antenna is a dish-type antenna; and wherein said dish-type antenna has an ellipsoidal surface contour.

2. The interferer of claim 1, further comprising a power source interface;

wherein said power source interface is for interfacing with a power source.

3. The interferer of claim 2, further comprising a control and monitoring panel;

wherein said waveform generator is connected to said control and monitoring panel; and wherein said control and monitoring panel is connected to said power source interface.

4. The interferer of claim 3, further comprising a modulated high voltage (HV) power supply;

wherein said waveform generator is connected to said modulated HV power supply;

wherein said control and monitoring panel is connected to said modulated HV power supply; and wherein said modulated HV power supply is connected to said at least one microwave generator.

5. The interferer of claim 4, further comprising an antenna adjustment mechanism;

wherein said control and monitoring panel is connected to said antenna adjustment mechanism; and wherein said ellipsoidal antenna is connected to said antenna adjustment mechanism.

6. The interferer of claim 1, wherein said wireless microwave interferer generates a high power 2.46 GHZ adjustable-geometry, modulated, microwave beam.

7. The interferer of claim 2, wherein said power source is one of standard house current of 120/240 VAC and 50/60 Hz, military/aviation power of 120/240 VAC and 400 Hz, and automotive of 12/24 VDC;

wherein said automotive of 12/24 VDC has an inverter; and wherein said inverter of said automotive of 12/24 VDC converts DC to one of the standard house current of 120/240 VAC and 50/60 Hz and the military/aviation power of 120/240 VAC and 400 Hz.

8. The interferer of claim 5, wherein said control and monitoring panel controls said wave form generator;

wherein said control and monitoring panel controls said modulated HV power supply; and wherein said control and monitoring panel controls said antenna adjustment mechanism.

9. The interferer of claim 1, wherein said wave form generator generates a number of different selectable waveforms tailored to have maximum effectiveness on different classes of targets.

10. The interferer of claim 5, wherein said modulated HV power supply provides all necessary voltages and signals for said wireless microwave interferer;

wherein low voltages feed said wave form generator;

wherein said low voltages feed filaments of high power RF devices;

wherein said low voltages feed said antenna adjustment mechanism;

wherein said low voltages feed performance indicators;

wherein a High Voltage/High Power section of said power supply responds to signals from said at least one microwave generator; and wherein said High Voltage/High Power section of said power supply converts said signals from said at least one microwave generator into high power signals that feed said high power RF devices.

11. The interferer of claim 4, wherein said at least one microwave generator is a magnetron; and wherein said magnetron converts high power modulated signals from said modulated HV power supply into high power, modulated, microwave jamming signals.

12. The interferer of claim 11, wherein when said magnetron is only one magnetron, jamming mode is rectification;

wherein when said magnetron is two magnetrons activated simultaneously, modes of jamming are active, rectification, and spectrum generation;

wherein said magnetron operates at a high duty-cycle; and wherein said magnetron is cooled by a cooling system.

13. The interferer of claim 12, wherein said waveguide to co-ax transformer and combiner combines High Power Microwave signals from said two magnetrons; and wherein said waveguide to co-ax transformer and combiner converts said signals into a single co-axial mode output port.

* * * * *